Figure 1:
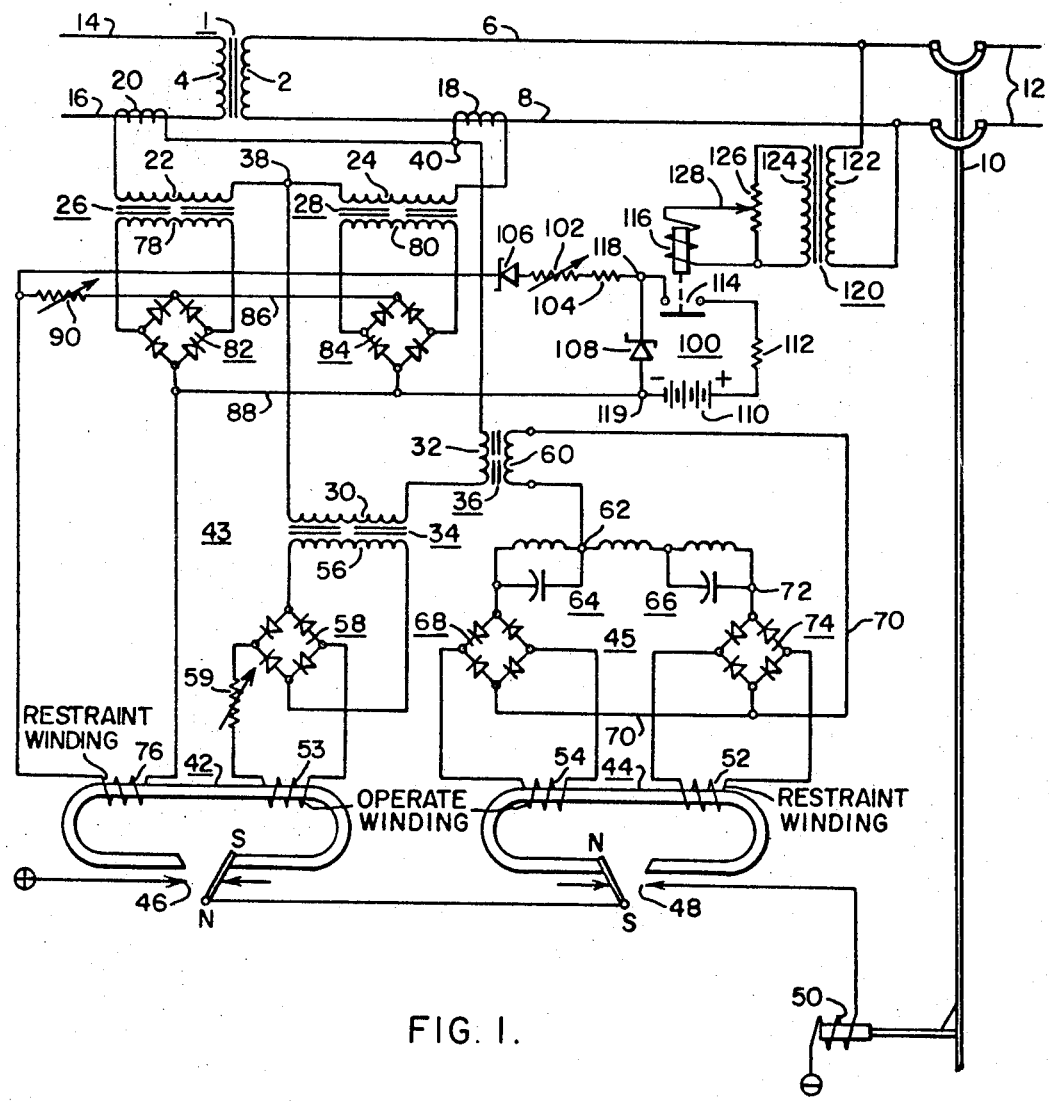

United States Patent

[11] 3,579,040

[72] Inventor Nathaniel D. Tenenbaum
 Plainfield, N.J.
[21] Appl. No. 800,109
[22] Filed Feb. 18, 1969
[45] Patented May 18, 1971
[73] Assignee Westinghouse Electric Corporation
 Pittsburgh, Pa.

[54] DESENSITIZING CIRCUIT FOR DIFFERENTIAL RELAY
 17 Claims, 2 Drawing Figs.
[52] U.S. Cl. .................................................. 317/27,
 317/14
[51] Int. Cl. .................................................. H02h 3/28
[50] Field of Search .................................... 317/14, 18,
 27, 52, 53, 36 (D)

[56] References Cited
 UNITED STATES PATENTS
 2,426,062  8/1947 Sonnemann ................... 317/36
 3,414,772 12/1968 Sonnemann ................... 317/14

Primary Examiner—James D. Trammell
Assistant Examiner—Harry E. Moose, Jr.
Attorneys—A. T. Stratton, J. L. Stoughton and C. L. Freedman ABSTRACT: A differential type protective relaying apparatus for a power-transforming device; the relaying apparatus having first and second switches controlled by first and second operate elements and first and second restraint elements; said first operate element being energized as a function of the difference between the input and output energy of the transferring device and said first restraint element being energized as a function of the amount of energy passed through the transferring device and there is provided a second circuit, energized as a consequence of an overvoltage applied to the transferring device to supply additional energization to the first restraint element; the second operate element being energized as a function of the magnitude of the fundamental frequency portion of the difference between the input and output energy to and from the transferring device; and the second restraint element being energized as a function of the magnitude of the second harmonic frequency portion of the difference between the input and output energy to and from the transferring device. The relaying apparatus being effective to disconnect the power-transferring device when one or the other of the first or the second operate element overcomes its associated restraint element.

Patented May 18, 1971

3,579,040

WITNESSES:
Bernard R. Gregucy
James F. Young

INVENTOR
Nathaniel D. Tenenbaum
BY
John L. Stoughton
ATTORNEY 3,579,040

DESENSITIZING CIRCUIT FOR DIFFERENTIAL RELAY

CROSS-REFERENCES TO RELATED APPLICATIONS

This invention is an improvement upon application Ser. No. 561,505, filed June 29, 1966 now U.S. Pat. No. 3,414,772 dated Dec. 3, 1968, U.S. Pat. No. 3,144,590 dated Aug. 11, 1964, and U.S. Pat. No. 3,275,889 dated Sept. 27, 1966.

BACKGROUND OF THE INVENTION

Differential protective relays used for the protection of power-transferring apparatus such as transformers sense the exciting current of the transformer because this exciting current is consumed within the differential zone of protection. Under conditions of operation as at normal or rated voltage, this presents no problem because the sensitivity of the differential relay is adjusted to make allowance for this difference. There are occasions, however, when the condition of operation is abnormal resulting in a voltage supplied to the transformer bank which is much higher than normal, thus causing a substantial increase in the exciting current. Such a condition may be brought about by many causes as for example a substantial and sudden lessening of the connected load. A rule of thumb is that the transformer-exciting current doubles for every 10 percent increase of voltage above normal. When the overvoltage is high enough, the exciting current increases sufficiently to falsely trip the differential relay.

Prior-art protective relays, as illustrated in the foregoing recited patents, embody a harmonic-restraint unit which operates to prevent the relay from tripping when the second harmonic of the exciting current exceeds a certain value with respect to the fundamental component. This harmonic induced restraint is very useful in preventing false operation on magnetizing inrush, because, in the case of magnetizing inrush when a transformer is first energized, there is always a plentiful supply of second harmonic. The foregoing units as illustrated in U.S. Pat. No. 3,144,590 and U.S. Pat. No. 3,275,889 are not presently useful for the overvoltage conditions described above. The Sonnemann patent discloses one way in which the relay may be modified to respond to overvoltage conditions by providing an additional source of second harmonic to increase the energization of the restraint winding 52 of the Sonnemann patent as the voltage between the conductors 6 and 8 increases.

SUMMARY OF THE INVENTION

It is the object of this invention to eliminate the necessity for generating the second harmonic for application to the restraint winding energized by the second harmonic component and to provide a voltage-actuated circuit to additionally energize the restraint winding of the differential current-actuated switch.

A further object of this invention is to maintain a certain minimum energization of the restraint element at all times.

A still further object of this invention is to provide a source of constant potential to energize the restraint winding at all times when the energization thereof from the energy signal obtained from the energy flow through the transferring device is below the magnitude of the voltage supplied from the constant potential source.

A still further object of the invention is to provide current-responsive means in the constant potential energized circuit such as a resistor to provide an overlap in which the restraint winding may be energized by current derived from the energy-responsive network and from the constant potential supplied network.

Figure 2:
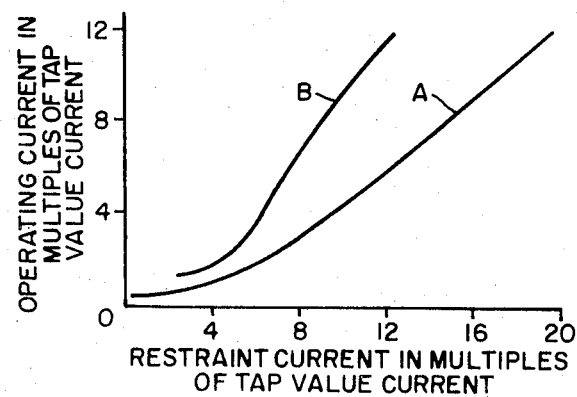

Other objects of the invention will be apparent from the specification, the claims and the drawings in which drawings:

FIG. 1 is a schematic diagram of a protective differential relay as applied to protect a power transformer and embodying the invention; and FIG. 2 is a showing of the difference in the operation of the differential relay caused by the present invention.

In describing the invention, a preferred form thereof is shown associated with a single-phase transformer. It is to be distinctly understood however that the invention is equally applicable to polyphase transformer banks and other types of power-transferring apparatus. In the event a polyphase transformer bank is to be protected, the apparatus illustrated in FIG. 1 would be substantially duplicated for each of the phases of the polyphase network.

Referring to the drawings by characters of references, the numeral 1 indicates generally a power transformer which is to be protected. The transformer 1 has a first winding 2 and a second winding 4. The primary winding 2 is energized from conductors 6 and 8 which are connected through contacts of a suitable current-interrupting switch or breaker 10 to a suitable source of alternating potential energy indicated generally by the conductors 12. The second winding 4 of the transformer is connected to energize conductors 14 and 16.

Current flow into and out of the transformer 1 is sensed by means of current transformers 18 and 20 associated with the current conductors 8 and 16 respectively. The current transformers 18 and 20 are connected in series with each other through the primary windings 22 and 24 of mutual reactors or transactors 26 and 28 respectively. The primary windings 30 and 32 of the transactors 34 and 36, respectively, are connected between the common connection 38 of the windings 22 and 24 and the common connection 40 of the secondary windings of the current transformers 18 and 20. Mutual reactors or transactors are well known in the art and are devices which provide an output voltage in its secondary winding which is proportional to the magnitude of the current passed through the primary winding.

The current-transforming ratios of the current transformers 18 and 20 are selected with respect to the turns ratio of the windings of the transformer 1 such that when the volt-amperes in the primary winding 2 is exactly equal to the volt-amperes of the secondary winding 4, the current flow through the secondary winding of the current transformer 18 is equal to the current flow through the secondary winding of the transformer 20. In other words the turns ratio of the current transformer is the inverse of the voltage transformation provided by the transformer 1. With this selection, no current will flow through the primary windings 30 and 32 between the common connection 38 and 40 when the volt-amperes entering the transformer 1 is equal to the volt-amperes leaving the transformer 1.

In the event the transformer 1 develops an internal fault, more volt-amperes will flow into the primary winding 2 than will flow out of the secondary winding 4. This results in more current flowing through the secondary winding of the current transformer 18 than through the secondary winding of the current transformer 20. The excess current flowing in the current transformer 18 flows through the primary windings 30 and 32 of the mutual reactors or transactors 34 and 36 between the common connections 38 and 40. This current flow through the transactors 34 and 36 due to the internal fault is primarily at the fundamental frequency of voltage supplied by the conductors 12 and, as will be described below, serves to energize the operate windings 53 and 54 of a pair of polarized relays 42 and 44 of a differential unit 43 and a harmonic unit 45 respectively. When so energized, the relays 42 and 44 close their circuit-controlling contacts 46 and 48 and energize a trip coil 50 of the breaker 10. Switch 10 thereupon opens its circuit controlling contacts and deenergizes the conductors 6 and 8.

The operate winding 53 of the relay 42 is connected to the secondary winding 56 of the transactor 34 through a full wave rectifying bridge 58 and a variable resistor 59. The operate winding 53 is energized as a function of the magnitude of the unbalance current between the current transformers 18 and 20 as determined by the output voltage generated in the output winding 56 of the transactor 34. The harmonic unit 45 is energized from the potential supplied by the secondary winding 60 of the transactor 36. One terminal of the winding 60 is connected to a common terminal 62 of a pair of tuned networks 64 and 66.

The other terminal of the network 64 is connected through a full wave rectifying network 68 and a common bus 70 to the other terminal of the winding 60. Likewise the other terminal 72 of the tuned network 66 is connected through a full wave rectifying network 74 and the common bus 70 back to the other terminal of the secondary winding 60. With this arrangement the operate winding 54 is energized in accordance with the magnitude of the differential current flowing at the basic frequency of the source 12 while the restraint winding 52 is energized in accordance with the magnitude second harmonic frequency of the differential current. To accomplish this, the network 64 is tuned to block current at the second harmonic frequency and the network 66 is tuned to pass the second harmonic frequency as set forth in the above identified patents.

When transformers are initially energized, a transient magnetizing current flows in the primary winding for an initial time period resulting in a greater number of volt-amperes into the transformer than out of the transformer and provides a false indication of an internal fault. Since this initial magnetizing current is rich in the second harmonic frequency, the restraint winding 52 of the polarized relay 44 is energized sufficiently with respect to the energized condition of the operate winding 54 to prevent the relay 44 from closing its contacts 48. Therefore, irrespective of any closure of the contacts 46 of the relay 42, the trip coil 50 cannot be energized and the breaker 10 does not falsely disconnect the transformer 1 from the supply conductors 12.

If for some reason or other the voltage at the transformer 1 rises, as for example due to a sudden or severe decrease in the magnitude of the load supplied by the transformer 1 or for any other reason, the potential applied to the transformer 1 may increase substantially. Such an increase in voltage causes the core of the transformer 1 to operate at an increase flux density. With normally available transformers, the magnetizing current may substantially double for every 10 percent increase in voltage above the normal or rated voltage of the transformer.

With a sufficient increase in magnetizing current, the secondary winding of the current transformer 18 is sufficiently greater than the current in the secondary winding of the transformer 20. The magnitude of the resulting current flow through the windings 30 and 32 increases the output voltage of the mutual reactors 34 and 36 sufficiently to actuate the relays 42 and 44 and falsely trip the breaker 10. In accordance with the present invention, this unbalance in differential current is effectively counteracted by increasing the energization of the restraint winding 76 of the relay 42 which is energized by one of the transactors 26 and 28 which has the greater output voltage.

The restraint winding 76 of the relay 42 is energized by one of the windings 78 and 80 which has the higher output voltage as is shown in the above-mentioned patents. For this purpose the windings 78 and 80 of the transactors 26 and 28 are connected through full wave rectifying bridges 82 and 84 respectively to a pair of buses 86 and 88. These buses are connected to the restraint winding 76 of the relay 42 through a variable resistor 90. The resistor 90 adjusts the ratio of energization of the restraint winding with respect to the energy being passed through the transformer 1.

In accordance with this invention, the undesired energization of the trip coil 50 and resultant opening of the breaker 10 is prevented by supplying a restraining current to the restraint winding 76 from a constant of potential source 100 and applied through resistors 102 and 104 and an asymmetric current flow device 106 to the restraint winding 76 in parallel with the current provided by the buses 86 and 88. Preferably the asymmetric device 106 takes the form of a Zener diode connected with its minimum impedance direction in a connection for flow of current from the network 100 to the winding 76 and having a voltage characteristic such that the breakover value thereof is greater than any expected reverse voltage which may be applied thereacross due to the energization of the buses 86 and 88. The preference for a Zener type of diode is to provide a device which will, if subjected to an abnormal reverse transient voltage, reform without destroying itself as might occur were a normal diode used in its stead.

The output voltage of the supply 100 is determined in the usual manner by means of a Zener diode 108 energized from a suitable source of electrical direct current supplied from a suitable source schematically illustrated as a battery 110. The source may be the same station battery supplying the plus and minus terminals associated with the controlling circuit for the breaker winding 50. The positive terminal of the battery 110 is connected through a resistor 112 and the contacts 114 of a voltage-sensitive relay 116 of the positive voltage terminal 118 of the Zener diode 108. The negative potential terminal 119 of the Zener diode 108 is connected to the negative terminal of the battery 110 and to the bus 88.

The voltage-sensing relay 116 is energized by the voltage which exists between the conductors 6 and 8 by means of a transformer 120 having its primary winding 122 connected to the buses 6 and 8 and its secondary winding 124 connected to the end terminals of a potentiometer 126. One terminal of the winding of the relay 116 is connected to the common terminal of the potentiometer 126 and the winding 124 and the other terminal of the relay winding is connected to the movable arm 128 of the potentiometer 126.

In FIG. 2 the curve A shows the operating characteristic of the protective relay without the addition of the apparatus 100 for energizing the restraint winding 76 as a consequence of overvoltage between the conductors 6 and 8. The curve B shows the operating characteristic of the same relay with the apparatus 100 energizing the restraint winding 76 from the battery 110 with a current as determined by the Zener diode 108 and the resistors 102 and 104.

When the voltage between the conductors 6 and 8 exceeds a predetermined potential as adjustably determined by the position of the potentiometer arm 128, the relay 116 will be energized and close its contacts 114 to render the apparatus 100 effective to supply additional current to the restraint winding 76. This additional current increases the effect of the restraint winding 76 and increases the magnitude of the differential current required to operate the relay 42 to close its contacts 46.

In one form of this invention it is preferred to utilize a Zener diode 108 which will maintain an output of voltage at its terminal of substantially 24 volts. The resistance of the resistors 102 and 104 which may be varied upwardly and downwardly from a total resistance having a mean value of 620 ohms. The output voltage from the transactors 26 and 28 may vary from 0 volts to 10 volts at a current rating of 60 times normal current into the transformer 1.

Since numerous changes may be made in the above-described apparatus and different embodiments of the invention may be made without departing from the spirit thereof, it is intended that all matter contained in the foregoing description or shown in the accompanying drawings shall be interpreted as illustrative and not in a limiting sense.

I claim:

1. In a protective relaying apparatus for an electrical apparatus adapted to pass electrical energy therethrough in substantially undiminished magnitude, a first control means having a first operate input means and a first restraint input means and a first switch means, said control means acting to place said switch means in a first closed circuit-controlling condition solely when the ratio of energization of said operate means with respect to said restraint means is greater than a first predetermined magnitude, a first current-responsive device associated with the input side of said electrical apparatus and having a first output quantity the magnitude of which is a function of the magnitude of the current in said input side, a second current-responsive device associated with the output side of said electrical apparatus and having a second output quantity the magnitude of which is a function of the magnitude of the current in said output side, a first network energized as a function of the difference in magnitudes of said first and second output quantities and providing a third output quantity of a magnitude proportional to said difference in magnitudes, first circuit means connecting said first network to said operate input means for energization thereof by said third output quantity, a second network energized as a function of the magnitude of one of said first and second output quantities and providing a fourth output quantity of a magnitude proportional to said one output quantity, an operating condition responsive device connected to said first restraint input means, a fifth output quantity supplying network controlled by said operating condition responsive device and having an output circuit energized to supply a fifth output quantity as a consequence of the actuation of said operating condition responsive device, said operating condition responsive device being actuated to provide said fifth output quantity solely when the magnitude of the signal applied thereto is above a predetermined magnitude, and means connecting said output circuit and said second network to said restraint input means whereby said restraint means is energized as a function of the combination of said fourth and said fifth output quantities, the magnitude of said fifth quantity being independent of the increase in the magnitude of the signal applied to said responsive device above said predetermined magnitude thereof.

2. The combination of claim 1 in which said operating condition responsive device is a voltage-responsive device and is actuated when a voltage greater than a predetermined magnitude is applied to said electrical apparatus.

3. The combination of claim 2 in which the ratio of the input current to the output current at said electrical apparatus is of a second predetermined magnitude substantially equal to the ratio of the output voltage to the input voltage at said electrical apparatus, the ratio of the magnitude of said current function of said first current device to the magnitude of said current function of said second current device being equal to the reciprocal of said second predetermined magnitude, and said fifth quantity being of a substantially constant magnitude.

4. The combination of claim 3 in which said first and second quantities are alternating polarity quantities, said fourth quantity is a rectified alternating polarity quantity and said fifth quantity is a unidirectional polarity quantity of substantially constant magnitude.

5. The combination of claim 4 in which said fourth quantity and said fifth quantity are voltage quantities and in which said second network and said fifth output quantity network each includes asymmetric current flow devices preventing the interchange of current therebetween.

6. The combination of claim 3 in which said first and second current-responsive devices comprise first and second current transformers, said second network comprises first and second transactors, said transactors primary and secondary windings, said primary windings of said transactors and said secondary windings of said current transformers being connected in series, said second network further including first and second rectifier means individually connected across the individual secondary windings of said first and second transactors respectively and including a circuit connecting the rectified current output connections of said rectifier means in parallel circuit, the output voltage of said parallelly connected rectifier means being said fourth output quantity, said first network including a third transactor having its primary winding connected in parallel with said secondary winding of said first current transformer and said primary winding of said first transactor and also in parallel with said secondary winding of said second current transformer and said primary winding of said second transactor, and a third rectifier means connected across the secondary winding of said third transactor, said third output quantity being the output voltage of said third rectifier means, said first circuit means being the connections of the rectified current output connections of said third rectifier means to said operate input means, said fifth output supplying network comprising a source of substantially constant unidirectional potential and an asymmetric current flow device, said means connecting said output circuit and said second network to said restraint means including the circuit connecting said output connections of said first and second rectifier means to said restraint means in parallel with the circuit connecting said source of substantially constant potential through said asymmetric device.

7. The combination of claim 6 in which there is provided a second control means having a second operate input means and a first restraint input means and a first switch means, a breaker control circuit including said first and second switch means, a fourth transactor having a primary winding connected in series with said primary winding of said third transactor, fourth and fifth rectifier means, first and second tuned networks, said second network being tuned to pass a harmonic of the frequency to which said first network is tuned to pass, means connecting the secondary winding of said fourth transactor through said fourth rectifier means and said first tuned network to said second operate input means, means connecting said secondary winding of said fourth transactor through said fifth rectifier means and said second tuned network to said second restraint input means, said electrical apparatus including magnetizable material which tends to saturate at potentials applied thereto greater than said predetermined magnitude at which said fifth output quantity is supplied.

8. In a protective relaying apparatus of the type having an output circuit energized when the ratio between a first signal applied to an operative element and a second signal applied to a restraint element exceeds a predetermined magnitude, said first signal having a magnitude which is a function of the difference between the magnitudes of a first characteristic of each of a pair alternating potential quantities, said second signal having a magnitude which is a function of the one of said pair of quantities having the greater magnitude, the improvement comprising a control network having an input means and an output means and a control means effective to energize said output means with a third signal solely when the magnitude of a fourth signal applied to said input means is greater than a first desired amount, means energized by a second characteristic of one of said alternating potential quantities and effective when the magnitude of said second characteristic exceeds a desired amount to provide a magnitude of said fourth signal of said first desired amount, means connecting said last-named means to said input means for supply of said fourth signal thereto, and means connecting said output means to said restraint element, said restraint element being effective when energized by said third signal to increase said ratio.

9. The combination of claim 8 in which the magnitude of said third signal is of a substantially constant magnitude amount.

10. The combination of claim 9 in which said second signal is a unidirectional electric current of a magnitude determined by the magnitude of said one quantity, said one quantity being a current quantity, said third signal being a unidirectional current, said fourth signal being a signal having its magnitude determined by the magnitude of the voltage of a selected one of said pair of alternating quantities.

11. In a differential protective relaying apparatus for a power-transferring device adapted to pass electrical energy therethrough, first and second input means adapted to provide first and second electrical measuring quantities having magnitudes which are responsive to first and second energizing quantities which have magnitudes related to the input and output power of the transferring device, circuit means interconnecting said first and said second input means and having output terminals energized with an output quantity the magnitude of which changes with a change in the difference in magnitude between the magnitude of said first electrical measuring quantity applied by said first input means and the magnitude of a second electrical measuring quantity applied by said second input means, a switch means, a first electrical network connected between said output terminals and said switch means and effective to provide a first actuating signal to said switch means which changes in magnitude with a change in magnitude of said output quantity, a third input means adapted to provide a third electrical measuring quantity having a magnitude which is responsive to a third energizing quantity at one side of said transferring device, said third energizing quantity being a different quantity from said first and second energizing quantities, and a second electrical network interconnecting said third input means and said switch means and effective to provide an altering signal of a magnitude independent of the magnitude of said third energizing quantity and solely at magnitudes of said third energizing quantity above a predetermined magnitude to alter the actuation of said switch means by said electrical network.

12. The combination of claim 11 in which said first and second energizing quantities are current derived quantities, and said third energizing quantity is a voltage derived quantity.

13. The combination of claim 12 in which said second electrical network acts to alter the actuation of said switch means to increase the difference in magnitude between the magnitude of said first electrical quantity and the magnitude of said second electrical quantity required to actuate said switch means.

14. The combination of claim 11 in which said switch means is provided with an operate and a restraint winding, said first electrical network being connected to energize said operate winding, said second electrical network being connected to reenergize said restraint winding, said second electrical network being effective to supply a second actuating signal to said restraint winding.

15. The combination of claim 14 in which said second actuating signal is of a constant magnitude.

16. The combination of claim 15 in which said power-transferring device is a transformer having first and second windings magnetically coupled together by a flux-carrying member, said first input means being energized in accordance with the current in said first winding, said third input means being energized in accordance with the voltage applied to one of said windings, said second input means being energized in accordance with the current in said second winding.

17. The combination of claim 16 in which said second network includes a relay having a coil connected to be energized by the voltage applied to said one winding, said relay having normally open contacts closed by a predetermined energization of said coil to supply said second actuating signal.